United States Patent
Wiesenberg et al.

(10) Patent No.: US 11,223,928 B1
(45) Date of Patent: Jan. 11, 2022

(54) UNSECURED OBJECT DETECTION AND ALERT

(71) Applicant: TOYOTA MOTOR ENGINEERING & MANUFACTURING NORTH AMERICA, INC., Plano, TX (US)

(72) Inventors: Ryan M Wiesenberg, Ann Arbor, MI (US); Emily S Lerner, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/071,768

(22) Filed: Oct. 15, 2020

(51) Int. Cl.
*H04W 4/029* (2018.01)
*H04W 4/46* (2018.01)

(52) U.S. Cl.
CPC ............ *H04W 4/029* (2018.02); *H04W 4/46* (2018.02)

(58) Field of Classification Search
CPC ..... G01S 5/14; G01S 15/931; G06Q 10/0832; G06Q 50/28; G08G 1/20; G06T 7/20; G06T 7/70
See application file for complete search history.

(56) References Cited

U.S. PATENT DOCUMENTS

| | | | |
|---|---|---|---|
| 8,094,021 B2 * | 1/2012 | Nichols | G08B 13/2462 340/568.7 |
| 8,742,909 B2 | 6/2014 | Abuelsaad et al. | |
| 9,958,872 B2 * | 5/2018 | Anderson | B64D 47/08 |
| 10,207,707 B2 | 2/2019 | Kurata | |
| 2010/0007500 A1 * | 1/2010 | Mestres | G08B 13/1427 340/572.4 |
| 2011/0082812 A1 * | 4/2011 | Salemizadeh | G06Q 10/08 705/333 |
| 2011/0106362 A1 * | 5/2011 | Seitz | G05B 19/416 701/24 |
| 2016/0339959 A1 * | 11/2016 | Lee | G06K 9/00798 |
| 2017/0018619 A1 | 1/2017 | Ku et al. | |
| 2017/0349166 A1 * | 12/2017 | Anderson | B60W 30/02 |
| 2018/0096175 A1 * | 4/2018 | Schmeling | G06Q 10/08 |
| 2018/0208196 A1 * | 7/2018 | Kurata | G08G 1/165 |
| 2018/0286246 A1 * | 10/2018 | Baca | G08G 1/164 |
| 2019/0286148 A1 * | 9/2019 | Hase | G05D 1/0246 |
| 2020/0012871 A1 * | 1/2020 | Lee | G06K 9/00832 |
| 2020/0031284 A1 * | 1/2020 | Onica | B60P 1/00 |
| 2020/0034639 A1 * | 1/2020 | Fukuda | G06K 9/00805 |
| 2020/0074226 A1 * | 3/2020 | Oe | G06K 9/00805 |
| 2020/0172097 A1 * | 6/2020 | Hasegawa | H04W 4/46 |
| 2020/0255004 A1 * | 8/2020 | Raichelgauz | G08G 1/162 |
| 2020/0310438 A1 * | 10/2020 | Suzuki | G05D 1/0212 |
| 2020/0319638 A1 * | 10/2020 | Bowen | B60W 50/14 |
| 2021/0056322 A1 * | 2/2021 | Hasegawa | B60W 30/09 |

FOREIGN PATENT DOCUMENTS

| | | |
|---|---|---|
| CN | 201716827 | 1/2011 |
| JP | 2008299483 A | 12/2008 |
| JP | 2012194863 A | 10/2012 |

\* cited by examiner

*Primary Examiner* — Dung Hong
(74) *Attorney, Agent, or Firm* — Oblon, McClelland, Maier & Neustadt, L.L.P.

(57) ABSTRACT

A change in state is identified of cargo that, at least for a time period, is carried by a vehicle. Spatiotemporal data indicative of a time and a place at which the change in state of the cargo occurs are assembled. The spatiotemporal data are recorded in a distributed electronic ledger. An occupant of the vehicle is alerted of the change in state of the cargo.

17 Claims, 6 Drawing Sheets

UNSECURED OBJECT DETECTION AND ALERT

BACKGROUND

Falling and fallen objects on roadways pose significant risks to vehicles traveling thereon. Recent advances in computer vision and autonomous vehicle control have been brought to bear to mitigate such risks through identification of falling and fallen objects and alerting driver of the danger and/or carrying out evasive maneuvers.

Falling and fallen objects from vehicles also constitute a potential or actual loss of property. Tracking, locating and recovering lost cargo are areas of current engineering and product development efforts.

SUMMARY

A change in state is identified of cargo that, at least for a time period, is carried by a vehicle. Spatiotemporal data indicative of a time and a place at which the change in state of the cargo occurs are assembled. The spatiotemporal data are recorded in a distributed electronic ledger. An occupant of the vehicle is alerted of the change in state of the cargo.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 1:
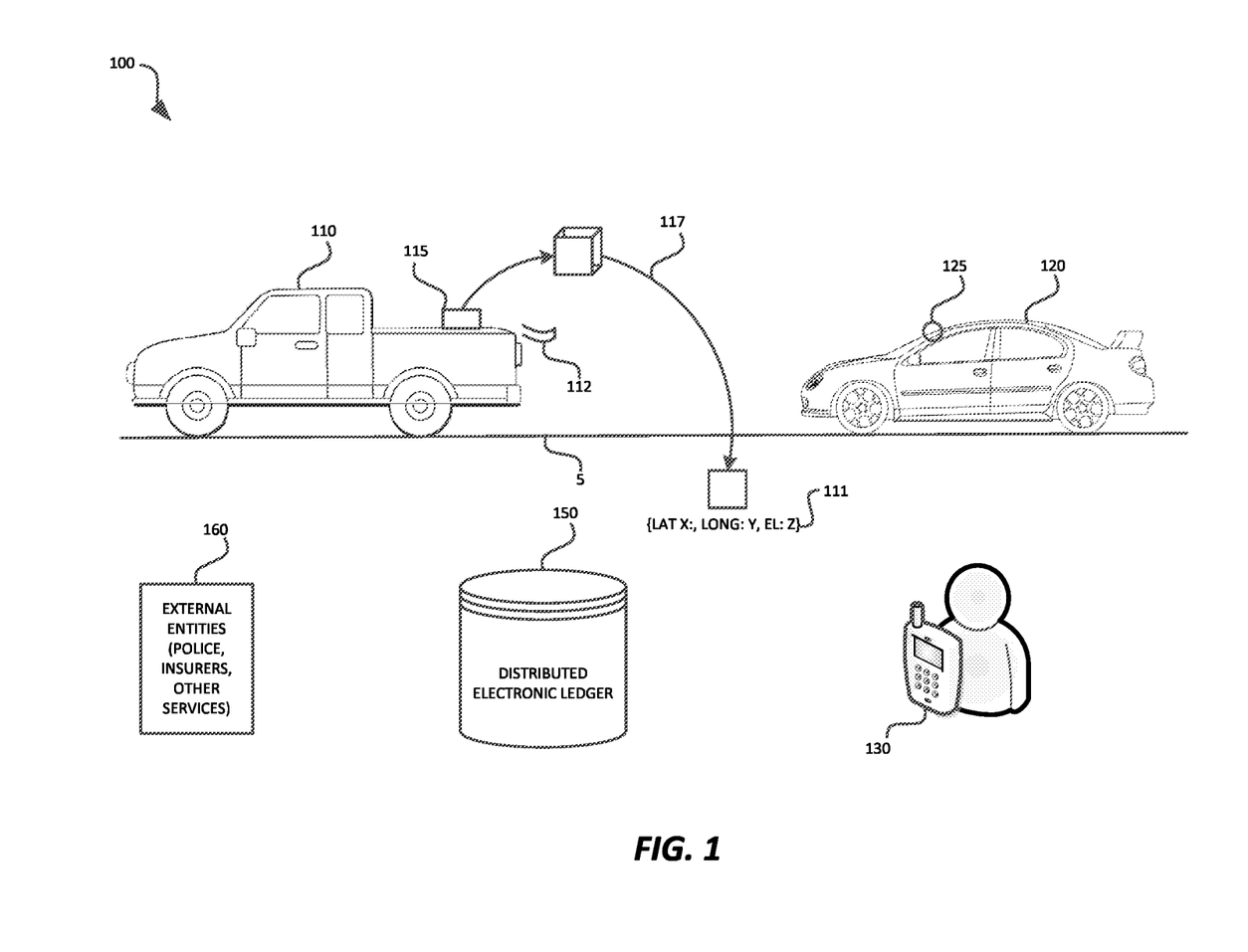
FIG. 1 is a diagram of an example environment with which basic principles and features of the present invention can be explained.

FIG. 1 is a diagram of an example environment 100 with which basic principles and features of the present invention are explained. Environment 100 includes a lead vehicle 110 that is carrying cargo 115 and a trailing vehicle 120; although it is to be understood that other vehicle arrangements can avail themselves of the benefits of the present invention. As described in more detail below, lead vehicle 110 and trailing vehicle 120 may have onboard computational and communication resources by which, among other things described below, information is conveyed therebetween. Additionally, lead vehicle 110 and trailing vehicle 120 may have onboard sensors by which each vehicle evaluates its environment. As skilled artisans will appreciate, such sensors may include cameras, radar, lidar, global positioning system receivers and so on. For purposes of explanation, trailing vehicle 120 includes a forward-facing camera 125 along with computational resources by which computer vision image processing techniques are implemented.

In the scenario depicted in FIG. 1, lead vehicle 110 and trailing vehicle 120 move along a roadway 5 when, in a first instance, a hold down strap 112 comes loose from cargo 115 in lead vehicle 110 and begins to wave under the influence of air currents. Camera 125 of trailing vehicle 120 may capture video of waving hold down strap 112 and, through the aforementioned computer vision image processing techniques, may identify thereby an unsecured cargo situation. Accordingly, an alert may be transmitted from trailing vehicle 120 to lead vehicle 110, such as by vehicle-to-vehicle (V2V) communications, that indicates to an occupant thereof that cargo is not secured. A similar technique may be employed that detects relative motion (e.g., sliding, wobbling, etc.) between cargo 115 and lead vehicle 110, thus indicative of unsecured cargo.

In another instance, cargo 115 may become separated from lead vehicle 110 and may come to rest at a physical location, indicated in FIG. 1 at location 111. By way of the sensors previously described, trailing vehicle 120 may track cargo 115 as it leaves lead vehicle 110 and is conveyed by momentum through a trajectory 117. In certain embodiments, computational resources onboard trailing vehicle 120 may compute trajectory 117 from laws of motion as cargo 115 leaves the field of view of the sensors. Additionally or alternatively, sensors aboard lead vehicle 110 may determine that cargo 115 has separated from vehicle 110 and computational resources aboard lead vehicle 110 may compute trajectory 117 from known parameters (motion vector of lead vehicle 110, known weight of cargo 115, GPS location, etc.), known geography of the region in which the cargo was lost (from, e.g., map data), laws of physics, etc. In either case, an alert may be conveyed to an occupant of lead vehicle 110 that indicates that cargo 115 has become separated from lead vehicle 110.

In certain embodiments, a distributed electronic ledger 150, such as a blockchain, may be deployed. Copies of distributed ledger 150 may be maintained on, among other places, vehicles, mobile devices and a centralized server. Consensus and synchronization of distributed electronic ledger 150 may occur over a peer-to-peer (P2P) network using suitable protocols and signaling conventions. In certain embodiments, as an alternative mechanism for synchronization, computing devices (e.g., vehicles, mobile devices) may connect to a central server that maintains an updated copy of distributed electronic ledger 150. Such a server may further include a database containing the records of distributed electronic ledger 150 to afford efficient lookup of the data contained in those records.

When cargo 115 becomes separated from lead vehicle 110 and a potential landing location has been computed, either by lead vehicle 110 or by trailing vehicle 120, an entry into distributed electronic ledger 150 may be made that contains information about the cargo and the computed potential landing location. When so embodied, users on computing devices, e.g., handheld computing device 130, may query distributed electronic ledger 150, such as through the database constructed on a central server, for information regarding lost cargo. When such lost cargo has been found, the user may upload the information to the P2P network and, upon validation by the peer community, an entry is made into distributed electronic ledger 150 indicating that cargo 115 has been located. Such validation may consider whether the cargo finder is in an area at or about (within a specified region) the landing point of the cargo. Photographic and GPS data may also be used for validation purposes. Computing device users may include law enforcement, insurers and other services 160 that may receive alerts about lost cargo.

Figure 2:
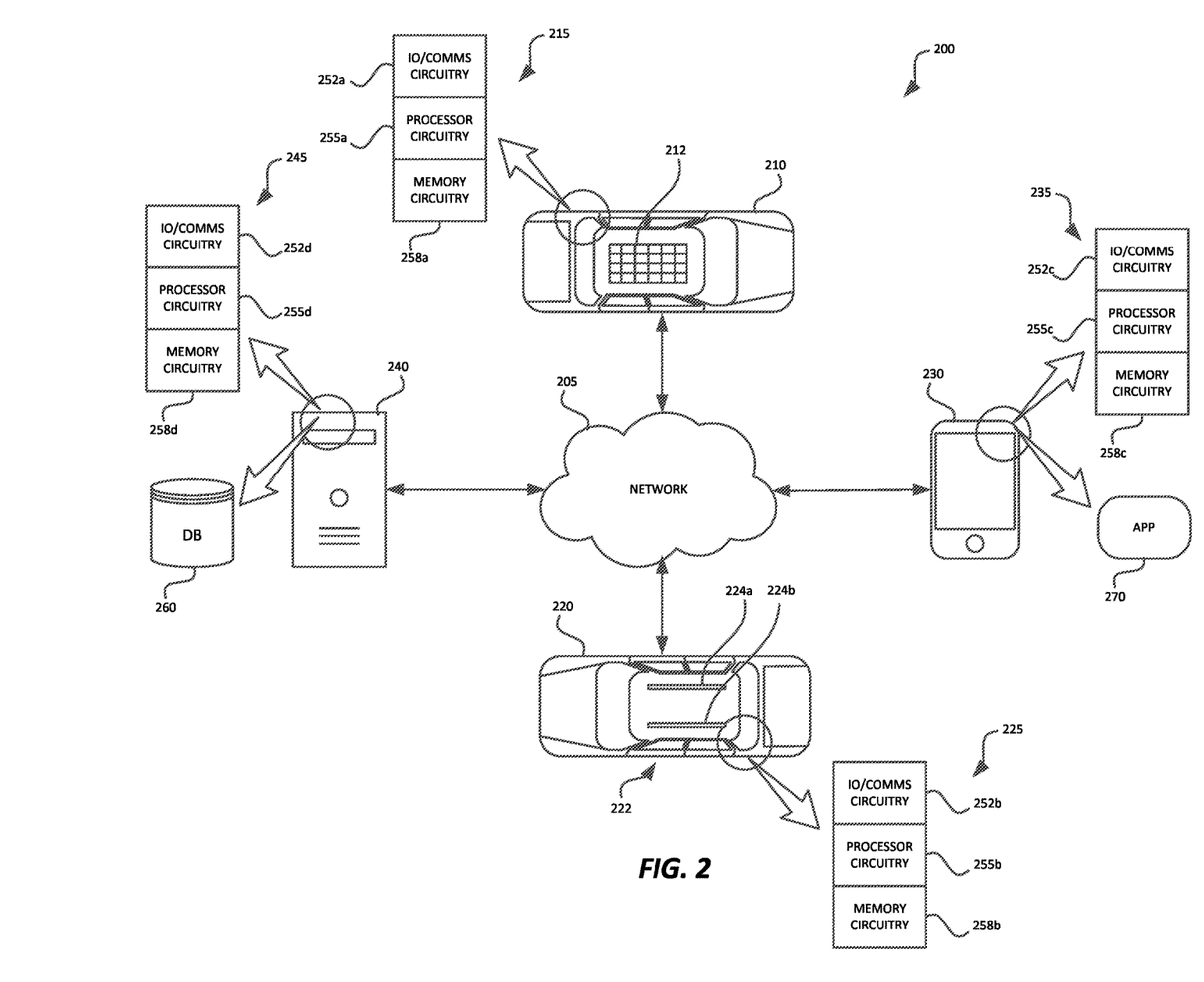
FIG. 2 is diagram of an example system by which the present invention can be embodied.

FIG. 2 is diagram of an example system 200 by which the present invention can be embodied. As is illustrated, an automotive vehicle (or, simply vehicle 210) may be communicatively coupled to one or more other vehicles 220 through a network 205. Network 205 represents infrastructure by which components operating in system 200 can intercommunicate using a variety of communication technologies and protocols. As can be appreciated, communications network 205 can be a public network, such as the Internet, or a private network such as a LAN or WAN network, or any combination thereof and can also include PSTN or ISDN sub-networks. Network 205 may include wired segments, such as an Ethernet network, and wireless segments, such as a cellular network including EDGE, 3G, 4G and 5G wireless cellular systems. The wireless network can also be WiFi, Bluetooth, visible light communications, or any other wireless form of communication that is known. In certain embodiments, such wireless communication technologies may be brought to bear to implement vehicle-to-vehicle (V2V) and vehicle-to-everything (V2X) communication signaling conventions and protocols.

System 200 may include other components that communicate and/or interoperate with vehicles 210 and 220. For example, various computing devices, such as computing device 230 and server 240 may be included that have access to data generated by vehicles 210 and 220. As described in more detail below, such data may be entries in a distributed electronic ledger, such as a blockchain, and may be copied to a centralized database 260 located on, for example, server 240. Vehicles 210 and 220 may communicate between themselves and between computing device 230 and server 240 on respective channels logically defined in network 205.

As illustrated in FIG. 2, the components of system 200 may have respective storage, computing and communication resources as indicated at resources 215 for vehicle 210, resources 225 for vehicle 220, resources 235 for handheld computing device 230 and resources 245 for server 240. These sets of resources may include input-output (10)/communications circuitry 252a-252d, representatively referred to herein as IO/communications circuitry 252, processor circuitry 255a-255d, representatively referred to herein as processor circuitry 255, and memory circuitry 258a-258d, representatively referred to herein as memory circuitry 258. Those having skill in the art will appreciate various resource configurations that can implement the functionality described in this disclosure without departing from the spirit and intended scope of the present inventive concept. For example, resources 215 and 225 on respective vehicles 210 and 220 may be implemented in edge computing devices having sufficient computing and communication circuitry for machine learning, blockchain consensus processing and communication to various nodes using different signaling conventions and protocols.

Certain vehicles may include sensors that generate signals indicative of the state of cargo being carried thereby. For example, vehicle 210 may include a sensor grid 212 on its rooftop, although such sensor grid 212 may be located elsewhere on vehicle 210, such as in a truck bed. Such a grid may be pressure-responsive so as to indicate where on the rooftop the cargo is situated. As such, sensor grid 212 may be constructed or otherwise configured to generate a signal indicative of moving cargo. Such movement may include, without being limited to, sliding cargo, wobbling cargo and separation of the cargo from the vehicle.

In another embodiment, sensors may be built into various cargo retaining devices. For example, vehicle 220 may have installed thereon a cargo rack 222 comprising a pair of rails 224a and 224b, representatively referred to herein as rail(s) 224. Rails 224 may face one another and sensors (not illustrated) may be installed on the faces of rails 224. In one embodiment, such sensors may detect tension or the lack thereof on tie down devices (e.g., straps). In another embodiment, one rail 224 may have installed on an inner face thereof one or more light sources (not illustrated) and the other rail 224 may have installed on an inner face thereof one or more light detectors (not illustrated). Light beams emitted by the light sources may traverse the space between rails 224 and impinge upon the facing light detectors unless cargo interrupts the light beam(s). Accordingly, skilled artisans will appreciate that the position of the cargo can be inferred from which light beams are blocked and which light beams are not.

As illustrated in FIG. 2, users may access system 200 through a computing device 230, which may be implemented in a mobile device such as a laptop or smartphone, or may be implemented in a tethered device, such as a desktop workstation or server. Such a computing device 230 may be operated and maintained by an entity that has an interest in lost cargo, including law enforcement, emergency services, insurance companies, etc. Other computing devices 230 may be operated and maintained by individual persons to access features of system 200.

In certain embodiments, computing device 230 may have an app 270 installed thereon that allows access to the distributed electronic ledger, as described below. App 230 may also allow a user access to a records database that contains the records of the distributed electronic ledger. As such, a human user may query records of the distributed electronic ledger through database 260 to identify lost cargo that may be in the region in which the user finds herself. Having located cargo that has been separated from a vehicle, the user may report the found cargo and may record such in the distributed electronic ledger through app 270 on computing device 230.

Server 240 may be implemented on hardware and software resources of an entity maintaining and operating system 200. Server 240 may have an application executing thereon that monitors activity on the distributed electronic ledger so as to identify when and where cargo has been separated from a vehicle. When such an event occurs, server 240 may extract the corresponding record(s) from the distributed electronic ledger and populate database 260 accordingly.

Figure 3:
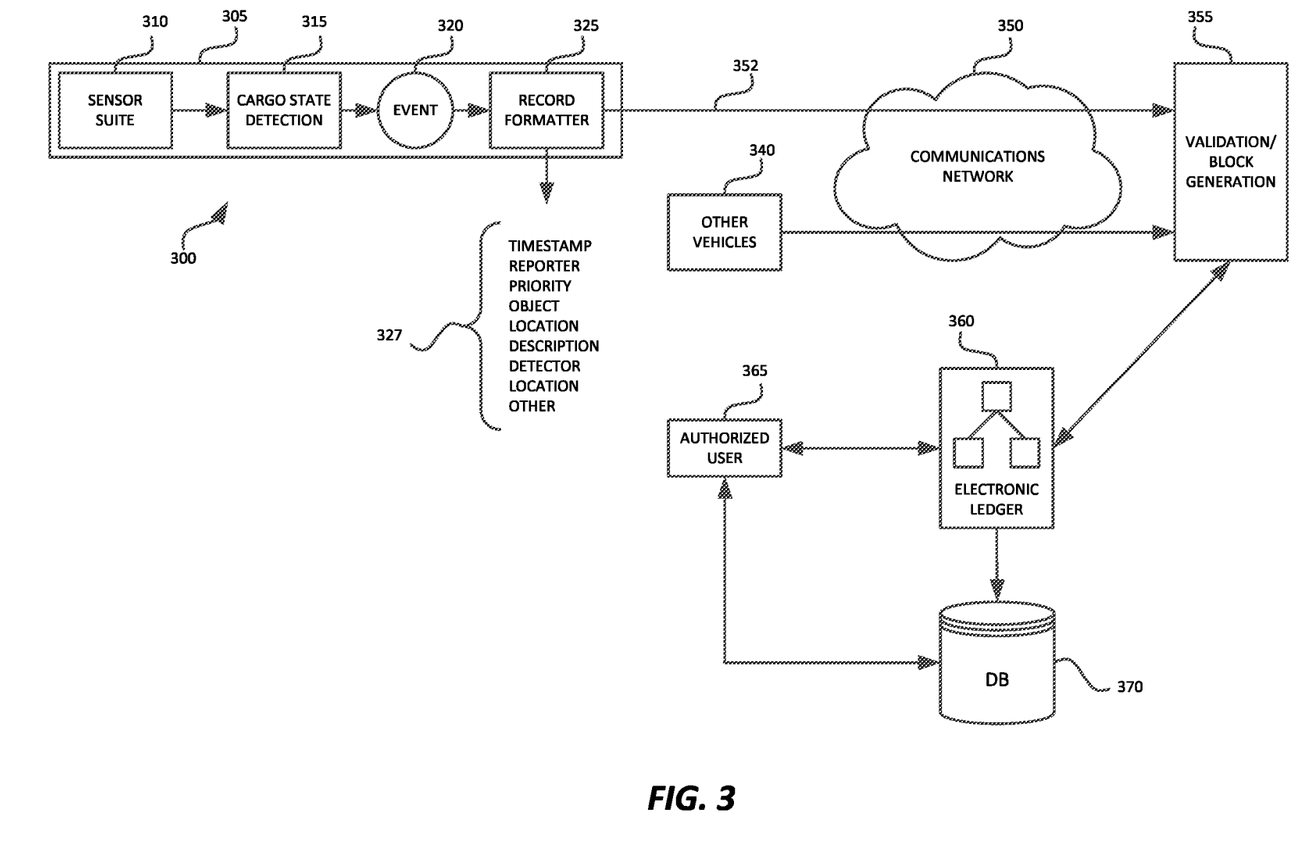
FIG. 3 is a schematic functional flow diagram of an example event-handling process that can be used in conjunction with the present invention.

FIG. 3 is a schematic functional flow diagram of an example event-handling process 300 that can be used in conjunction with the present invention. As illustrated in the figure and discussed above, resources available to vehicle 305 may comprise a sensor suite 310 that provides raw information from which a state of the vehicle can be assessed. Resources of vehicle 305 may be allocated to a cargo state detection component 315 that monitors cargo onboard vehicle 305 and determines from cargo-related signals a cargo state, e.g., {secure, unsecured, dropped}. Particular states, e.g., unsecured and dropped, may evoke an event 320, responsive to which one or more actions may be taken. For example, in addition to alerting an occupant of vehicle 305 and optionally occupants of other vehicles 340, information regarding the event, e.g., when an object has been dropped from a cargo hold or roof rack of vehicle 305, may be formatted into a message 327 containing such information as, for example, a timestamp, an identifier of the reporter, an indication of a priority, identifier of the object at issue, the location of the event, a description of the object, an indication as to what detector is used to determine the cargo state, a location of the lost cargo (based on trajectory) and other information that might be useful in recovering the lost object. The information may be formatted by record formatter 325 in a manner suitable for further processing by member entities of a peer-to-peer network. Such member entities may process, validate and enter data in distributed electronic ledger 360, as illustrated at validation/block generator component 355. Such validation may use a proof of work consensus mechanism that ensures the information contained in message 327 is consistent with lost and/or found cargo. Once validated, the data of message 327 may be entered into distributed electronic ledger 360 as well as entered into database 370 by, for example, extracting the data from distributed electronic ledger 360 or by making parallel entries into distributed electronic ledger 360 and database 370. An authorized user 365 may access database 370 for purposes of gathering information of lost cargo and may access distributed electronic ledger 360 to make entries therein reporting lost or found cargo.

Figure 4:
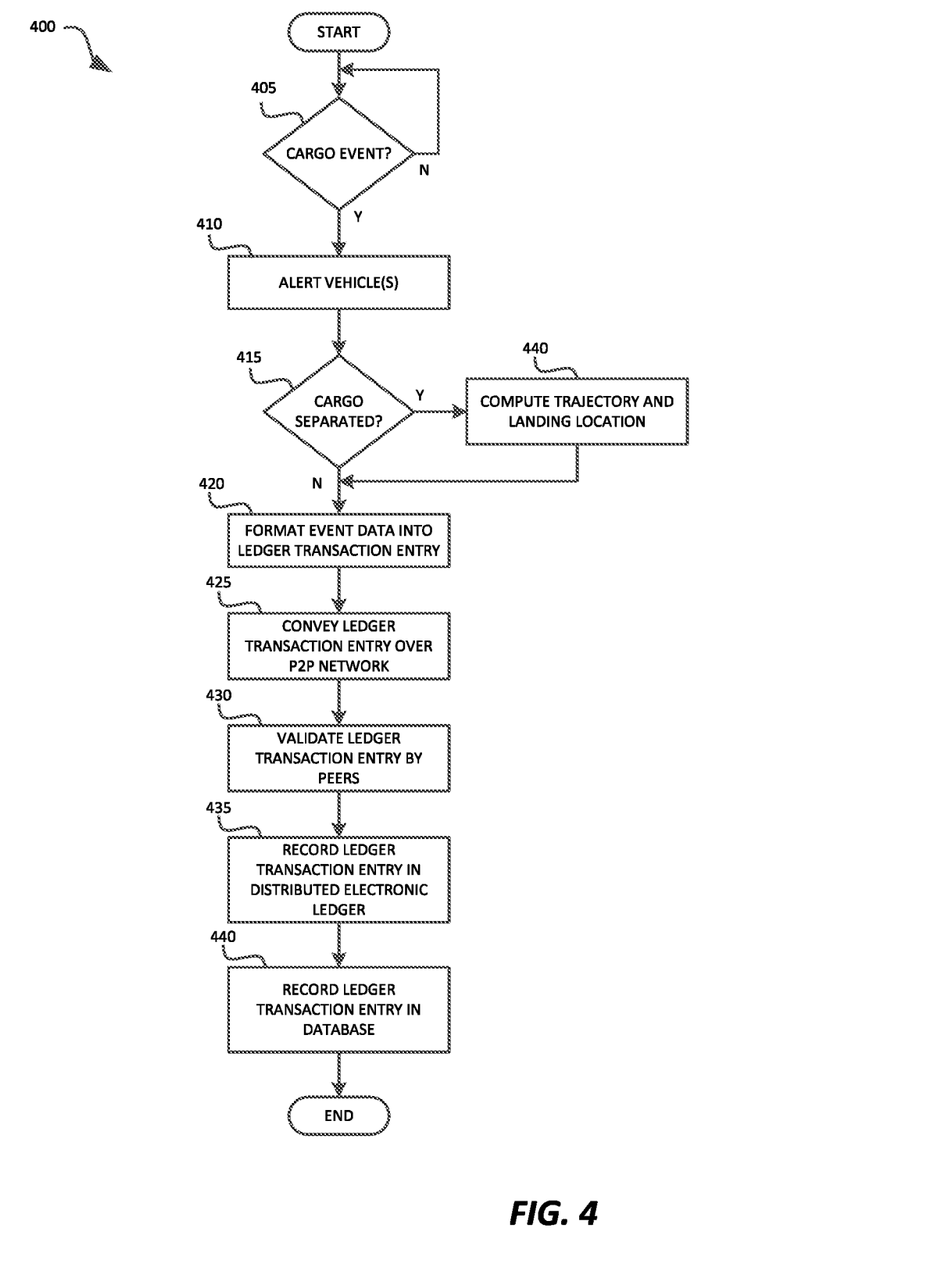
FIG. 4 is a flow diagram of example cargo monitoring process by which the present invention can be embodied.

FIG. 4 is a flow diagram of example cargo monitoring process 400 by which the present invention can be embodied. Cargo monitoring process 400 may execute on the cargo carrying vehicle and may constantly monitor the state of cargo being transported by the vehicle to determine, as indicated at operation 405, whether a cargo event has occurred. A cargo event occurs when a change in state of the cargo occurs, e.g., from "secured" to "unsecured" or "unsecured" to "separated" or "dropped." Upon such an event occurring, cargo monitoring process 400 may transition to operation 410, whereby an alert is issued to the subject vehicle (that on which the cargo state changed) and possibly to other vehicles in the region. Such alert to other vehicles may inform drivers in the region of a hazardous condition. In operation 415, it is determined whether the cargo has separated from the vehicle and, if so, the trajectory and landing location of the cargo is computed in operation 440. In operation 420, event data indicating when and where the event occurred may be formatted into a ledger transaction entry and, in operation 425, the ledger transaction entry may be conveyed over a P2P network to other nodes thereon, e.g., vehicles and computing devices. In operation 430, nodes on the P2P network may validate the ledger transaction entry according to a consensus mechanism and, subject to such validation, the ledger transaction entry may be recorded in a distributed electronic ledger in operation 435 and in a database in operation 440.

Figure 5:
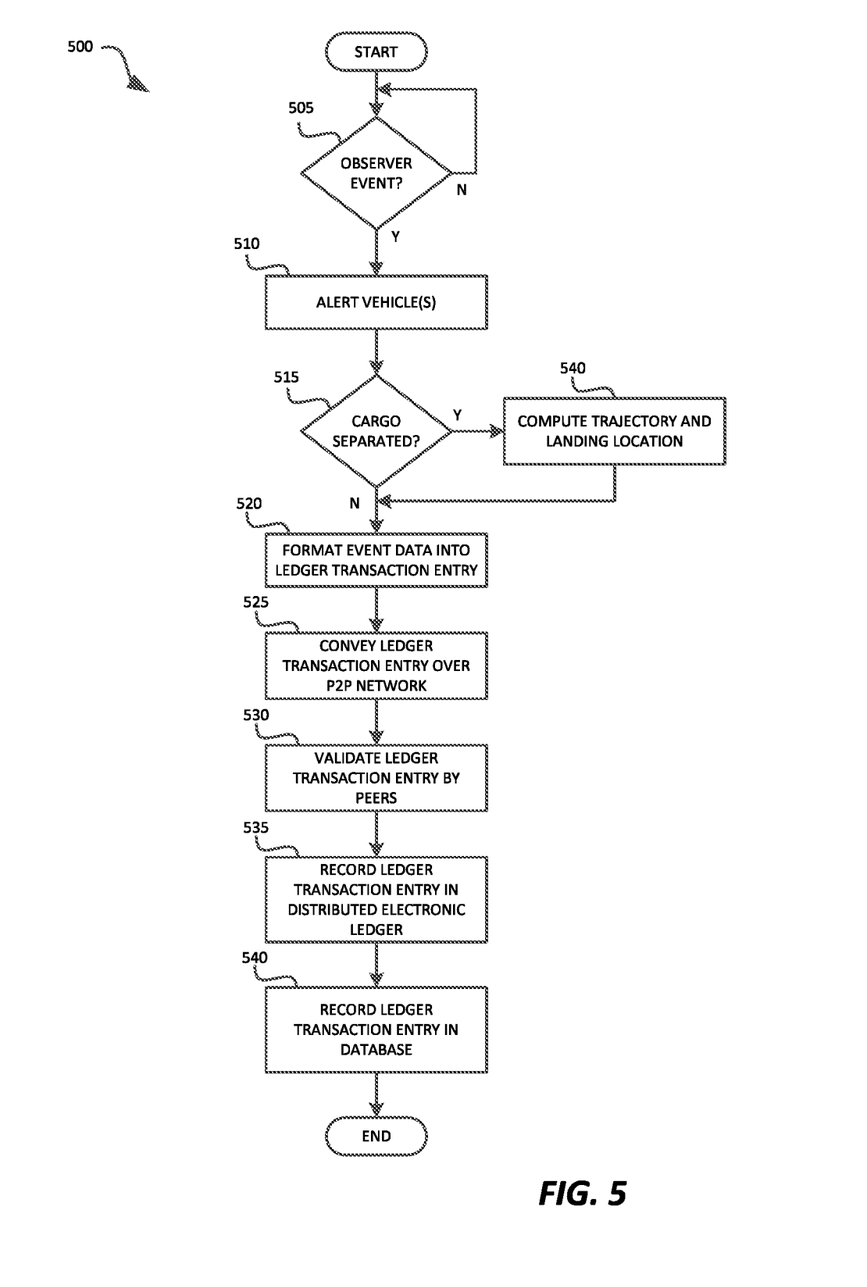
FIG. 5 is a flow diagram of example observer process by which the present invention can be embodied.

FIG. 5 is a flow diagram of an example observer process 500 by which the present invention can be embodied. Observer process 500 may execute on a vehicle other than that carrying the cargo and constantly monitors the state of cargo being transported by neighboring vehicles to determine, as indicated at operation 505, whether an observer event has occurred. An observer event occurs when a change in state of cargo occurs in an observed vehicle. Upon such an event occurring, observer process 500 may transition to operation 510, whereby an alert is issued to the subject vehicle (that on which the cargo state changed) and possibly to other vehicles in the region. Such alert to other vehicles may inform drivers in the region of a hazardous condition. In operation 515, it is determined whether the cargo has separated from the subject vehicle and, if so, the trajectory and landing location of the cargo is computed in operation 540. In operation 520, event data indicating when and where the event occurred may be formatted into a ledger transaction entry and, in operation 525, the ledger transaction entry may be conveyed over a P2P network to other nodes thereon. In operation 530, nodes on the P2P network may validate the ledger transaction entry according to a consensus mechanism and, subject to such validation, the ledger transaction entry may be recorded in a distributed electronic ledger in operation 535 and in a database in operation 540.

Figure 6:
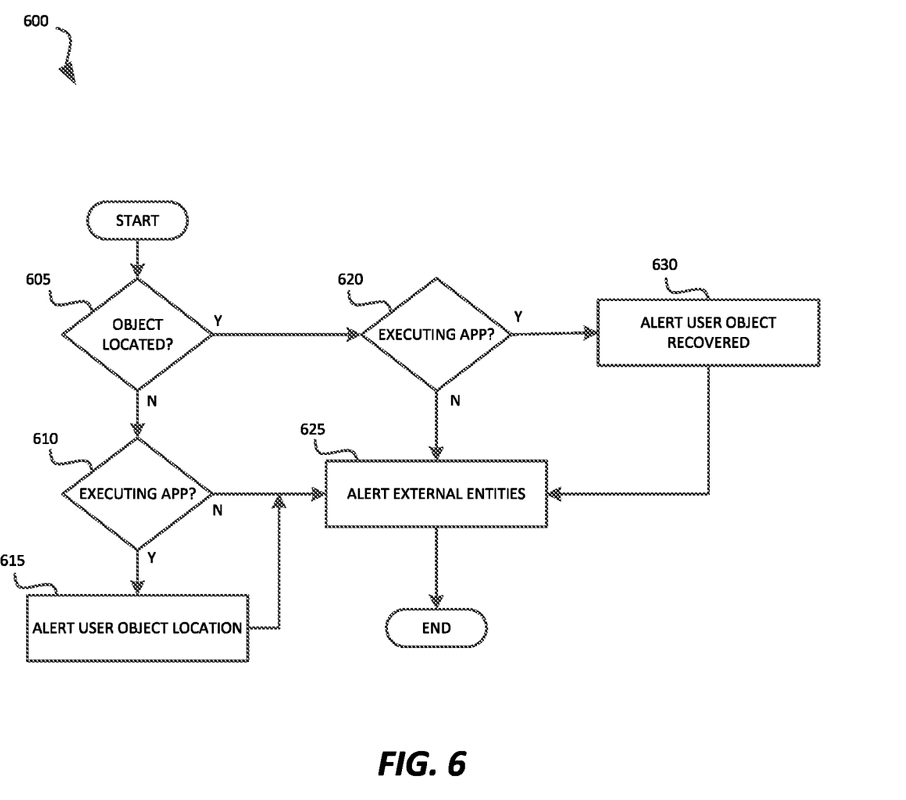
FIG. 6 is a flow diagram of example locator process by which the present invention can be embodied.

FIG. 6 is a flow diagram of an example locator process 600 by which the present invention can be embodied. Locator process 600 may be performed by a computing device in possession by a user, which may be a pedestrian or in a vehicle other than the cargo carrying vehicle, for purposes of locating lost cargo. In operation 605, it is determined whether an object, possibly lost cargo, has been located. If not, locator process 600 may transition to operation 610, by which it is determined whether the computing device is executing an app that is associated with embodiments of the invention. If the app is executing, a display on the computing device may indicate the location of missing cargo, such as by a map overlay. If the app is not executing, as determined at operation 610, external entities, e.g., police, insurance companies, other vehicles, etc., may be notified, such as through vehicle communications, that cargo is missing in operation 625. The external entities are also notified when the location of the missing cargo is indicated in operation 615. However, if the app is executing, such notification may occur through application layer messages of a suitable communication protocol.

If missing cargo has been located, as determined by operation 605, locator process 600 may transition to operation 620, whereby, once again, it is determined whether the app is executing on the computing device. If not, the external entities may be notified through vehicle communications that the cargo is missing in operation 625. If, however, the app is executing, as determined by operation 620, locator process 600 may transition to operation 630, by which an alert is issued indicating that the object has been recovered and, after transitioning to operation 625, the external entities are notified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method comprising:
    identifying a change in state of cargo that, at least for a time period, is carried by a vehicle;
    assembling spatiotemporal data indicative of a time and a place at which the change in state of the cargo occurs;
    recording the spatiotemporal data in a distributed electronic ledger in response to validation of the spatiotemporal data by at least one entity other than the vehicle;
    alerting an occupant of the vehicle of the change in state of the cargo;
    determining that the change in state of the cargo results in the cargo being separated from the vehicle;
    calculating a resting place of the cargo based on motion of the vehicle at the time and the place at which the change in state of the cargo occurs; and
    incorporating the resting place of the cargo into the spatiotemporal data recorded in the distributed electronic ledger.

2. The method of claim 1, further comprising:
    populating a database with the spatiotemporal data that is recorded in the distributed electronic ledger;
    retrieving the resting place of the cargo from the database by a computing device;
    locating the cargo using the retrieved resting place thereof; and
    recording an indication that the cargo has been located in the distributed electronic ledger.

3. The method of claim 2, further comprising retrieving the resting place of the cargo from the database by a handheld computing device.

4. The method of claim 2, further comprising retrieving the resting place of the cargo from the database by a computing device of another vehicle other than the vehicle on which the cargo is carried.

5. The method of claim 1, further comprising identifying the change in state of the cargo by an other vehicle other than the vehicle on which the cargo is carried, the other vehicle being that which records the spatiotemporal data in the distributed electronic ledger.

6. The method of claim 1, further comprising:
    storing respective copies of the distributed electronic ledger on multiple vehicles; and
    synchronizing the respective copies of the distributed electronic ledger via a vehicle-to-vehicle communications protocol.

7. An apparatus for tracing cargo that, at least for a time period, is carried by a vehicle, the apparatus comprising:
    processors removed one from the others and interoperating to:
        identify, by a processor of the processors, a change in state of the cargo;
        assemble, by the processor, spatiotemporal data indicative of a time and a place at which the change in state of the cargo occurs;
        record the spatiotemporal data in a distributed electronic ledger in response to validating the spatiotemporal data by a set of the processors;
        alert an occupant of the vehicle of the change in state of the cargo;
        determine, by the processor, that the change in state of the cargo results in the cargo being separated from the vehicle;
        calculate, by the processor, a resting place of the cargo based on motion of the vehicle at the time and the place at which the change in state of the cargo occurs; and
        incorporate, by the processor, the resting place of the cargo into the spatiotemporal data recorded in the distributed electronic ledger.

8. The apparatus of claim 7, wherein the processors are configured to:
    populate a database with the spatiotemporal data that is recorded in the distributed electronic ledger;
    retrieve the resting place of the cargo from the database;
    locate, by a user of another processor of the processors, the cargo using the retrieved resting place thereof; and
    record, in the distributed electronic ledger by the other processor, an indication that the cargo has been located.

9. The apparatus of claim 8, wherein the other processor is included in a handheld computing device.

10. The apparatus of claim 8, wherein the other processor is included in a computing device of a vehicle other than the vehicle on which the cargo is carried.

11. The apparatus of claim 7, wherein a processor other than the processor is included in an other vehicle other than the vehicle on which the cargo is carried, the other vehicle being that which records the spatiotemporal data in the distributed electronic ledger.

12. The apparatus of claim 7, wherein the processors are configured to:
    store respective copies of the distributed electronic ledger on multiple vehicles; and
    synchronize the respective copies of the distributed electronic ledger via a vehicle-to-vehicle communications protocol.

13. A tangible, non-transitory computer-readable medium having encoded thereon processor instructions that, when executed by a plurality of processors, compels the processors to:
    identify, by a processor of the processors, a change in state of cargo;
    assemble, by the processor, spatiotemporal data indicative of a time and a place at which the change in state of the cargo occurs;
    record the spatiotemporal data in a distributed electronic ledger in response to validating the spatiotemporal data by a set of the processors;
    alert an occupant of a vehicle of the change in state of the cargo;
    determine, by the processor, that the change in state of the cargo results in the cargo being separated from the vehicle;
    calculate, by the processor, a resting place of the cargo based on motion of the vehicle at the time and the place at which the change in state of the cargo occurs; and
    incorporate, by the processor, the resting place of the cargo into the spatiotemporal data recorded in the distributed electronic ledger.

14. The computer-readable medium of claim 13, wherein the processor instructions include those that compel the processors to:

populate a database with the spatiotemporal data that is recorded in the distributed electronic ledger;
retrieve the resting place of the cargo from the database;
locate, by a user of another processor of the processors, the cargo using the retrieved resting place thereof; and
record, in the distributed electronic ledger by the other processor, an indication that the cargo has been located.

15. The computer-readable medium of claim 14, wherein the other processor is included in a handheld computing device.

16. The computer-readable medium of claim 14, wherein the other processor is included in a computing device of a vehicle other than the vehicle on which the cargo is carried.

17. The computer-readable medium of claim 13, wherein a processor other than the processor is included in an other vehicle other than the vehicle on which the cargo is carried, the other vehicle being that which records the spatiotemporal data in the distributed electronic ledger.

\* \* \* \* \*